United States Patent
Detwiler et al.

(10) Patent No.: US 9,924,248 B2
(45) Date of Patent: Mar. 20, 2018

(54) PON WAVELENGTH BONDING FOR HIGH-RATE SERVICES

(71) Applicant: Adtran, Inc., Huntsville, AL (US)

(72) Inventors: Thomas Detwiler, Huntsville, AL (US); Richard Lee Goodson, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days.

(21) Appl. No.: 15/341,677

(22) Filed: Nov. 2, 2016

(65) Prior Publication Data
US 2017/0155983 A1 Jun. 1, 2017

Related U.S. Application Data

(60) Provisional application No. 62/261,683, filed on Dec. 1, 2015.

(51) Int. Cl.
*H04J 14/00* (2006.01)
*H04Q 11/00* (2006.01)
*H04B 10/27* (2013.01)

(52) U.S. Cl.
CPC ......... *H04Q 11/0067* (2013.01); *H04B 10/27* (2013.01); *H04Q 2011/0088* (2013.01)

(58) Field of Classification Search
CPC ...... H04J 14/02; H04J 14/023; H04J 14/0234; H04J 14/0236; H04J 14/0239; H04J 14/0245; H04B 10/27; H04B 10/50; H04Q 11/0066; H04Q 11/0067; H04L 12/4633; H04L 47/29
USPC ........ 398/66, 67, 68, 69, 70, 71, 72, 79, 98, 398/99, 100, 45, 48, 49, 50, 58, 59, 51; 370/352, 392, 389, 468, 431, 329, 465
See application file for complete search history.

(56) References Cited

U.S. PATENT DOCUMENTS

| 2010/0027557 | A1* | 2/2010 | McGarry | H04L 12/2867 370/431 |
| 2017/0012731 | A1* | 1/2017 | Luo | H04J 14/023 |
| 2017/0070295 | A1* | 3/2017 | Remein | H04B 10/50 |

* cited by examiner

*Primary Examiner* — Hanh Phan
(74) *Attorney, Agent, or Firm* — Fish & Richardson P.C.

(57) ABSTRACT

Methods, systems, and apparatus for Passive Optical Network (PON) wavelength bonding are disclosed. In one aspect, a first frame of data to a first optical network unit (ONU) is transmitted by an optical line terminal (OLT) over a first wavelength. While the first frame of data is being transmitted to the first ONU over the first wavelength, a first portion of a second frame of data to a second ONU is transmitted by the OLT over a second wavelength. After transmission of the first frame of data over the first wavelength has completed and while the first portion of the second frame of data is still being transmitted to the second ONU over the second wavelength, a second portion of the second frame of data to the second ONU is transmitted by the OLT over the first wavelength.

24 Claims, 8 Drawing Sheets

PON WAVELENGTH BONDING FOR HIGH-RATE SERVICES

CROSS-REFERENCE TO RELATED APPLICATIONS

This application claims priority to U.S. Provisional Application No. 62/261,683, filed Dec. 1, 2015, entitled "NG-PON2 Wavelength Bonding for High-rate Services," the entire disclosure of which is incorporated by reference herein.

BACKGROUND

This specification relates to Passive Optical Network (PON) wavelength bonding.

In a PON, data rates are increasing to 10 Gbps per wavelength, and 25 Gbps per wavelength in the near future. However, demand for peak data rates may exceed the per-wavelength rate of installed equipment, such that multiple wavelengths may be used to increase capacity between an Optical Line Terminal (OLT) and an Optical Network Unit (ONU). For example, Next Generation Passive Optical Network (NGPON) with FEC enabled specifies an 8.67 Gbps peak rate per downstream/upstream wavelength, and using two wavelengths would increase the peak rate to 17.34 Gbps per downstream/upstream.

SUMMARY

In general, one innovative aspect of the subject matter described in this specification can be embodied in methods for improving bandwidth available to individual packet flow between an Optical Line Terminal (OLT) and an Optical Network Unit (ONU) on a Passive Optical Network (PON) by bonding multiple wavelengths available to both the OLT and the ONU. One example computer-implemented method includes transmitting, by a first telecommunications device, one or more data frames over multiple wavelengths simultaneously, the one or more data frames distributed across the multiple wavelengths over multiple fixed-length segments, receiving, by a second telecommunications device, the multiple fixed-length segments over the multiple wavelengths, and reassembling, by the second telecommunications device, the received multiple fixed-length segments based on synchronization and delay alignment of the transmitted multiple fixed-length segments.

Another example computer-implemented method includes transmitting, over a first wavelength and by an OLT, a first frame of data to a first ONU, transmitting, over a second wavelength and by the OLT, a first portion of a second frame of data to a second ONU while the first frame of data is being transmitted to the first ONU over the first wavelength, and after transmission of the first frame of data over the first wavelength has completed and while the first portion of the second frame of data is still being transmitted to the second ONU over the second wavelength, transmitting a second portion of the second frame of data to the second ONU over the first wavelength.

Methods can further include receiving the second frame of data, determining, prior to transmitting the first portion of the second frame of data, when transmission of the first frame of data over the first wavelength will be completed, and determining, based on when transmission of the first frame of data over the first wavelength will be completed, the first portion of the second frame of data that will be transmitted over the second wavelength and the second portion of the second frame of data that will be transmitted over the first wavelength.

Methods can further include identifying a specified wavelength order that specifies an order in which portions of a single data frame are to be transmitted over available wavelengths. Transmitting the first portion of the second frame of data over the second wavelength comprises transmitting the first portion of the second frame of data over a given wavelength that is highest in the wavelength order and is available to transmit data while the first frame of data is being transmitted over the first wavelength. Transmitting the second portion of the second frame of data over the first wavelength comprises the following operations: determining that the first wavelength is next highest in the wavelength order after the second wavelength, and transmitting the second portion of the second frame of data over the first wavelength based on the determination that the first wavelength is the next highest in the wavelength order. Identifying the specified wavelength order may comprise identifying an NG-PON2 channel numbering corresponding to wavelengths being used to transmit data.

Methods can further include identifying a specified wavelength order that specifies an order in which portions of a single data frame are to be transmitted over available wavelengths, determining, based on the wavelength order, that the second wavelength is last in the wavelength order and that the first wavelength is first in the wavelength order, and in response to determining that the second wavelength is last in the wavelength order and that the first wavelength is first in the wavelength order, transmitting the second portion of the second frame of data over the first wavelength. Transmitting the second portion of the second frame of data over the first wavelength is based on the determination that the first wavelength is the first in the wavelength order.

Methods can further include transmitting a third frame of data to the second ONU over the first and second wavelengths based on a specified wavelength order. The first and second wavelengths carry no traffic right before transmitting the third frame of data. Various portions of the third frame of data are assigned round robin to the first and second wavelengths. In addition, for each of the first and second wavelengths an 8 bytes header is added with payload length for the third frame of data.

These and other embodiments can each, optionally, include one or more of the following features. The first portion of the second frame of data and the second portion of the second frame of data are both transmitted to the second ONU without a sequence number. Various portions of the second frame of data are assigned to various different wavelengths based on a specified ordering of the wavelengths. Frames of data are divided into 4 bytes segments or any other size of segments (e.g., 8 bytes segments, 16 bytes segments). In addition, the OLT may implement a dynamic allocation algorithm using wavelength as a parameter in bandwidth allocation for bonded entities. The dynamic allocation algorithm allocates time grants for different wavelengths of a bonded Transmission Container (TCONT) based on which wavelengths will be available and how much data is being transmitted when in a bonded mode of operation.

Particular embodiments of the subject matter described in this specification can be implemented so as to realize one or more of the following advantages. The methods, devices, and/or systems described in the present disclosure can synchronize and time equalize bit streams of a packet flow, for example, between an OLT and an ONU, on multiple wavelengths. Different portions (e.g., fixed size segments) of a given packet in the packet flow are distributed on the multiple wavelengths at one end of a communications path (e.g., at the OLT) on-demand at real-time basis, and combined at the other end of the communications path (e.g., the ONU). In doing so, latency for transmitting the packet is reduced, since the packet is transmitted on multiple wavelengths simultaneously and each wavelength only carries a portion of the packet instead of the whole packet. In addition, demand for peak data rate of a packet flow exceeding a data rate of a single wavelength can be supported. For example, with two wavelengths (e.g., each wavelength having an 8.67 Gbps peak data rate) carrying a packet comprising multiple words (e.g., 64-bit words) between an OLT and an ONU, the odd words of the packet can be sent on one wavelength and the even words of the packet can be sent on the other wavelength. As a result, the effective peak data rate between the OLT and the ONU is doubled (e.g., 17.34 Gbps). Furthermore, the disclosed method enables an OLT to dynamically balance loads according to offered non-bonded load (e.g., traffic carried by a single wavelength) and bonded load (e.g., traffic carried by multiple wavelengths in a bonding group), since bonded loads are distributed on available wavelengths in a bonding group on-demand, at real-time basis.

While some aspects of this disclosure refer to computer-implemented software embodied on tangible media that processes and transforms data, some or all of the aspects may be computer-implemented methods or further included in respective systems or devices for performing the described functionality. The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This document describes methods, systems, and apparatus for improving bandwidth available to individual packet flow on a Passive Optical Network (PON) by bonding multiple links (e.g., wavelengths). For example, a telecommunications device (e.g., an Optical Line Terminal (OLT)) can determine, in advance of transmitting a bonded packet, when each wavelength in a bonding group will be available for transmitting the bonded packet (e.g., when current transmission of a packet over a given wavelength will be completed). In addition, the telecommunications device can predetermine how many bytes of the bonded packet are to be sent on each bonded wavelength, so that transmissions of various portions of the bonded packet on the bonded wavelengths end at the same time or substantially simultaneously. Although this disclosure refers to passive optical telecommunications systems for purposes of example, the subject matter of this document can be applied to other types of telecommunications systems or other systems that offer multiple wavelengths for data transmission.

A Passive Optical Network (PON), such as a Next-Generation Passive Optical Network 2 (NG-PON2) or a 10 Gbps Ethernet Passive Optical Network (10 G-EPON), can provide 10 Gbps data rate per wavelength (not accounting for various overhead). For example, an OLT with multiple optical transceivers (e.g., multiple ports operating at different wavelengths) can transmit an 8.67 Gbps peak data rate to an ONU on one wavelength and receive an 8.67 Gbps peak data rate from the ONU on another wavelength. In some cases, the ONU may have multiple optical transceivers (i.e., a bonding-capable ONU with multiple tunable lasers) so that the ONU can receive data from the OLT on multiple wavelengths downstream and transmit data to the OLT on multiple wavelengths upstream.

The disclosed subject matter addresses problems that arise when required capacity between an OLT and an ONU exceeds maximum capacity of a single wavelength. For example, a packet flow on a PON needs bandwidth that exceeds the bandwidth provided by a single wavelength. In the present disclosure, an OLT can ascertain aggregate capabilities in both downstream and upstream directions (e.g., how many wavelengths each ONU can use in both downstream and upstream directions) of its attached ONUs through standard discovery mechanisms (e.g. physical layer operations, administration and maintenance (PLOAM) or ONU management and control interface (OMCI) in NG-PON2, or multi-point control protocol (MPCP) or Ethernet OAM in 10 G-EPON). For a bonding-capable ONU, the OLT can bond multiple wavelengths to transmit data to the ONU downstream and the ONU can bond multiple wavelengths to transmit data to the OLT upstream. Not all ONUs in a PON are required to participate in wavelength bonding. For example, there can be bonding-capable ONUs and non-bonding ONUs in the same PON. In addition, not all active wavelengths in a PON are required to carry bonded traffic. For example, there can be some wavelengths available to carry bonded traffic while other wavelengths carry only non-bonded traffic. The service and/or traffic flows can be aware of the wavelength bonding (e.g., which ONU is a bonding-capable ONU, which wavelength can carry bonded traffic). Wavelengths bonding can be achieved independently in the upstream and downstream directions, and can span a variable number of wavelengths. Any telecommunications systems with multiple wavelengths may benefit from the subject matter described in this document.

Figure 1A:
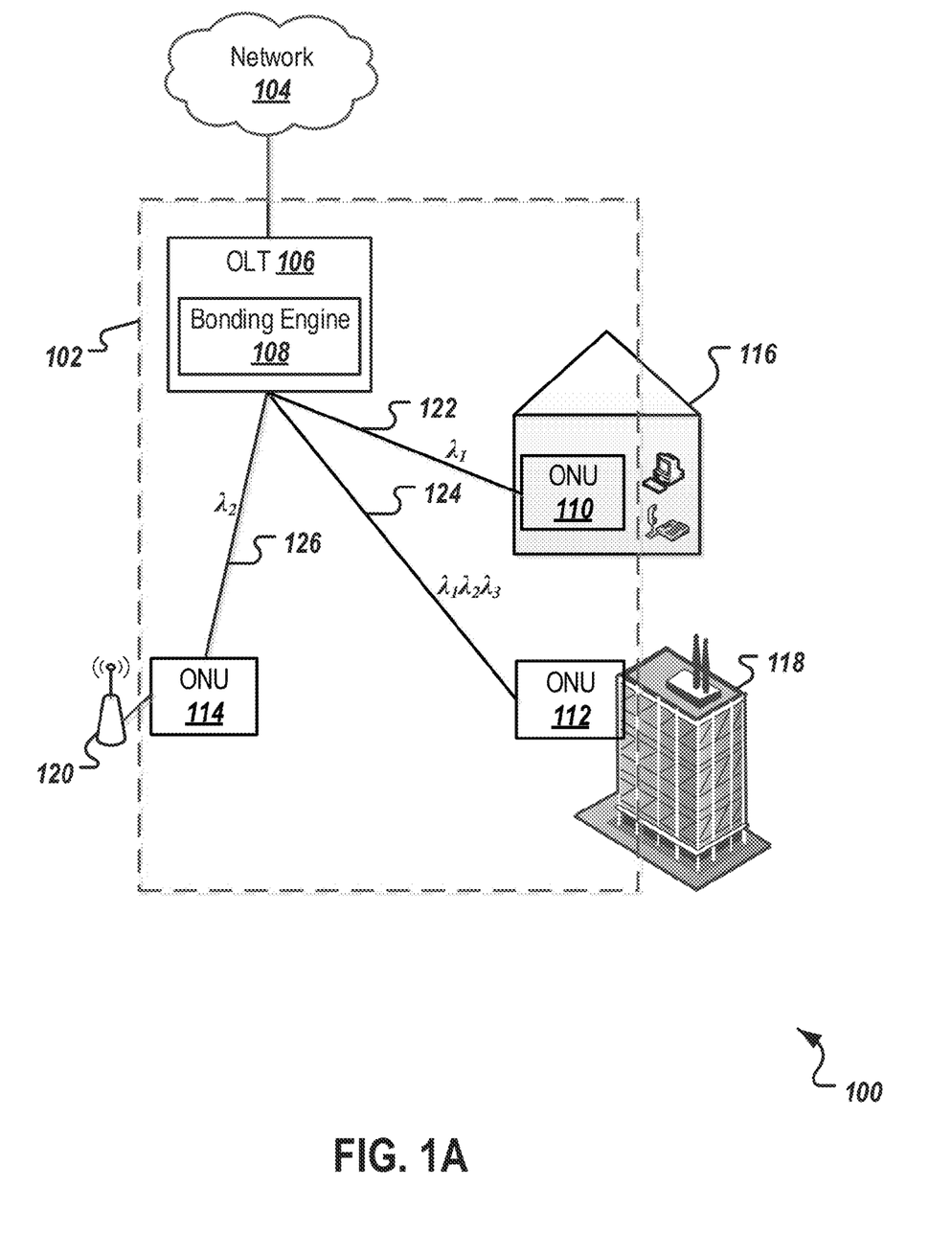
FIG. 1A is a block diagram illustrating an example networking environment for Passive Optical Network (PON) wavelength bonding.

FIG. 1A is a block diagram illustrating an example networking environment 100 in which wavelengths in a passive optical network (PON) can be bonded for providing high-rate low-latency services to individual packet flow. As illustrated in FIG. 1A, the environment 100 includes a PON 102 that connects users to a network 104. In some implementations, the environment 100 may include additional and/or different components not shown in the block diagram, such as one or more active optical networks (AONs), another type of network that provides network services (e.g., ADSL2+, VDSL2, etc.), or a combination of these and other technologies. In some implementations, components may also be omitted from the environment 100.

As illustrated, the PON 102 includes an OLT 106 at a service provider's central office (or other distribution point), an ONU 110 near residential locations 116, an ONU 112 near business locations 118, an ONU 114 near wireless communications equipment 120, a fiber optic link 122 connecting the OLT 106 and the ONU 110, a fiber optic link 124 connecting the OLT 106 and the ONU 112, and a fiber optic link 126 connecting the OLT 106 and the ONU 114. The OLT 106 is coupled to a number of ONUs 110, 112, and 114 (also referred to as optical network terminals (ONTs)), which are located near end users, thereby forming a point-to-multipoint network. For example, in the case of Next-Generation Passive Optical Network 2 (NG-PON2), a single OLT port can connect to 64 (or another number of) different ONUs. To serve multiple customers on the same network, the NG-PON2 uses logical multiplexing in a downstream direction and time-division multiplexing in an upstream direction.

Each ONU can include, or otherwise be coupled to, one or more customer-premises equipment (CPE) or subscriber devices (e.g., CPE modems). For example, the ONU 110 is a device that terminates the PON 102 at the customer end, and provides a service connection to a user living in the residential locations 116. The ONU 110 terminates optical fiber transmission, and can transform incoming optical signals into electrical signals, adapted for processing by subscriber devices. As a result, ONUs can provide network services, for example, to residential locations 116, business locations 118, or other forms of communications infrastructure, such as wireless communications equipment 120.

Each ONU can include one or more optical transceivers (e.g., one or more tunable lasers). For example, the ONU 110 includes one optical transceiver that can receive data from the OLT (or transmit data to the OLT) on a single wavelength $\lambda_1$. The ONU 112 includes multiple optical transceivers that can receive data from the OLT (or transmit data to the OLT) on three wavelengths $\lambda_1$, $\lambda_2$, and $\lambda_3$. The ONU 114 includes one optical transceiver that can receive data from the OLT (or transmit data to the OLT) on a single wavelength $\lambda_2$. As a result, the ONU 110 (e.g., a non-bonding ONU) can receive non-bonded data from the OLT (or transmit non-bonded data to the OLT) on a single wavelength $\lambda_1$. The ONU 112 (e.g., a bonding-capable ONU) can receive bonded data from the OLT (or transmit non-bonded data to the OLT) on three wavelengths $\lambda_1$, $\lambda_2$, and $\lambda_3$. The ONU 114 (e.g., a non-bonding ONU) can receive non-bonded data from the OLT (or transmit non-bonded data to the OLT) on a single wavelength $\lambda_2$. The disclosed subject matter does not require all ONUs on a same PON to support multiple wavelengths or bonding.

The OLT 106, as a network distribution element, provides an interface between the PON 102 and the network 104, and serves as the service provider's endpoint of the PON 102. The OLT 106 transmits downstream data traffic to ONUs (e.g., ONUs 110, 112, and 114), and receives upstream data traffic from the ONUs.

As illustrated, the OLT 106 includes a bonding engine 108 that can detect and identify a bonding-capable ONU on the PON 102. For example, the bonding engine 108 can detect and identify the ONU 112 as a bonding-capable ONU when the ONU 112 registers with the OLT 106. In addition, the bonding engine 108 can ascertain aggregate capabilities in both downstream and upstream directions between the OLT 106 and its attached ONUs through standard discovery mechanisms. For non-bonding ONUs, the OLT 106 will communicate with them according to, for example, an ITU PON standard (e.g., the NG-PON2 standard) or an IEEE PON standard (e.g., the 10 G-EPON standard). For a given bonding-capable ONU (e.g., ONU 112), the bonding engine 108 can allocate multiple wavelengths (e.g., $\lambda_1$, $\lambda_2$, and $\lambda_3$) in a bonding group between the ONU and the OLT 106 jointly/simultaneously, for the purpose of bonding data paths between the ONU and the OLT 106 together. Bonding can be achieved independently in the upstream and downstream directions, and can span a variable number of wavelengths between the ONU and the OLT 106.

In a downstream direction, for example, from the OLT 106 to the ONU 112, the bonding engine 108 can determine, in advance, when each wavelength among multiple wavelengths in a bonding group between the OLT 106 to the ONU 112 will be available for transmitting a bonded packet (e.g., by checking transmission schedule on each wavelength). If the multiple wavelengths are idle (e.g., carrying no traffic) when there is a bonded packet to send, the bonding engine 108 can assign various portions of the packet to the multiple wavelengths in the bonding group in a round robin way according to a specified wavelength order known to both the OLT 106 and the ONU 112 (e.g., stored in a memory of the OLT 106 and similarly stored in a memory of the ONU 112). For example, the OLT 106 can inform the ONU 112 of the wavelength order through a management channel, or the order could be established a priori such as according to ascending or descending wavelength. When the ONU 112 receives the various portions of the packet on the multiple wavelengths, the ONU 112 can use a delay equalization technique to align data reception across the synchronous data paths (e.g., ordered wavelengths) and reassemble the packet according to the specified wavelength order.

However, if one or more wavelengths among the multiple wavelengths are busy (e.g., carrying traffic) when there is a bonded packet to send, the bonding engine 108 can determine in advance when each wavelength in the bonding group will be available for transmitting the bonded packet (e.g., by checking a transmission schedule on each wavelength). The bonding engine 108 can predetermine how many bytes of the bonded packet are to be sent on each wavelength, so that transmissions of various portions of the bonded packet on the multiple wavelengths end at the same time or substantially simultaneously. The bonding engine 108 can start sending portions of the bonded packet on one or more idle wavelengths. As the one or more busy wavelengths complete sending its packet, the bonding engine 108 can start sending other portions of the bonded packet on these one or more now-available wavelengths to minimize latency of transmitting the packet. Various portions of the packet are allocated on the multiple wavelengths in a round robin way according to a specified wavelength order as discussed above. In some cases, when non-bonded traffic is heavy on a particular wavelength, the bonding engine 108 can balance the traffic load by not allocating bonded traffic on the particular wavelength.

In an upstream direction, for example, from the ONU 112 to the OLT 106, the bonding engine 108 can implement Dynamic Bandwidth Allocation (DBA) routines on each wavelength. The DBA routines on each wavelength can process grants to bonding-capable ONUs such that the same Allocation Identifier (Alloc-ID) (or Logical Link layer ID (LLID) for 10 G-EPON) is identified in the upstream direction to begin transmission on multiple wavelengths. For example, the bonding engine 108 can send bandwidth maps (BWmaps) for each wavelength to the ONU 112, and the ONU 112 can identify the same Alloc-ID in received BWmaps for multiple wavelengths. Whenever grants for the same Alloc-ID overlap across multiple wavelengths, the ONU 112 can allocate bonded data on the multiple wavelengths similar to the downstream direction, using a single bonded Transmission Container (bT-CONT) per wavelength corresponding to the Alloc-ID. In some implementations, the DBA routines on each wavelength can make the grants occur on different wavelengths at the same time, which in some cases leads to lower latency for traffic flows. In some implementations, the DBA routines on each wavelength can assign varying amounts of time per wavelength in order to optimize the DBA scheduling across offered load, which includes balancing bonded load and non-bonded load leading to higher throughput utilization in some cases. In some implementations, DBA could use multiple grants on multiple wavelengths per XGTC frame to minimize latency.

Figure 1B:
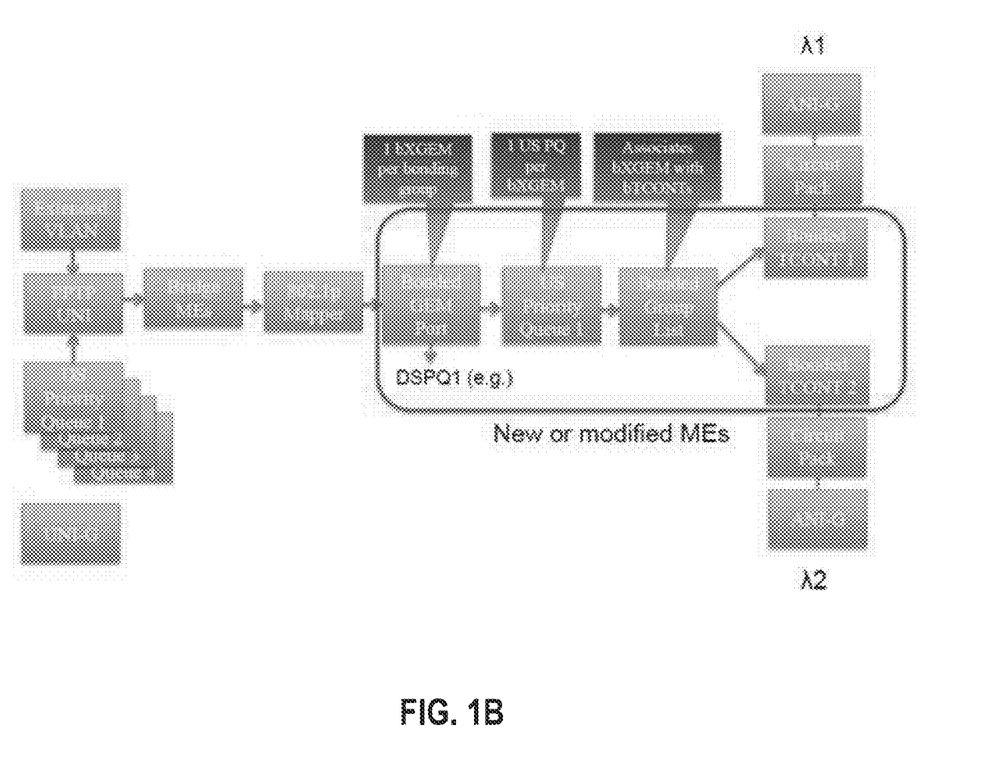
FIG. 1B is a block diagram illustrating an example ONU management and control interface (OMCI) for PON wavelength bonding.

The new elements related to bonding in the ONU and OLT need to be managed. For ITU PONs, the ONU is managed via OMCI (ONU management and control interface). For IEEE PONs, the ONU is managed via Ethernet OAM. PONs (including OLT and ONU) may also be managed via SNMP, NETCONF/YANG or other management protocols. For ITU PONs where the ONU is managed via OMCI, a relational diagram such as shown in FIG. 1B gives a representation of functions in the ONU so that they can be managed. In particular, a management representation of the bonded XGEM port and bonded T-CONT is needed. Also needed is a means (e.g. bonded group list) to associate the bonded XGEM ports with the bonded T-CONTS, and to associate a priority queue or set of priority queues with those bonded T-CONT.

In both the downstream and upstream directions, bit streams on the bonded wavelengths can be delay-equalized (e.g., via digital signal buffering), so that a given packet can be distributed on, for example, multiple wavelengths $\lambda_1$, $\lambda_2$, and $\lambda_3$ between the OLT 106 and the ONU 112, and end at similar times on the multiple wavelengths $\lambda_1$, $\lambda_2$, and $\lambda_3$. Due to the point-to-multipoint nature of a PON, delay equalization of multiple wavelengths can be performed at the receiver of the ONU 112 in the downstream direction. In the upstream direction, equalization can be performed at both of or either of the transmitter of the ONU 112 and/or the receiver of the OLT 106. In some implementations, both downstream and upstream transmissions can be synchronized with the reference clock of the OLT 106 in conformance with standard protocols (e.g. NG-PON2 and 10 G-EPON). Synchronizing with the reference clock of the OLT 106 can allow the ONU 112 to insert delay in a digital parallel and/or serial data path to achieve delay equalization. For example, in a NG-PON2, delay equalization can result in 64-bit alignment between bonded wavelengths (e.g., the quanta defined for 10-Gigabit-capable Passive Optical Network (XG-PON) Encapsulation Method (XGEM) payload and framing sublayer boundaries). In a 10 G-EPON, the alignment can be made in 66-bit blocks defined by the reconciliation sublayer. Other PON variations with higher speeds can achieve delay equalization at wider or narrower data width.

In some implementations, the operations performed by the bonding engine 108 can be implemented as operations performed by a data processing apparatus, on data stored on one or more computer-readable storage devices or received from other sources. The term "data processing apparatus" encompasses all kinds of apparatus, devices, and machines for processing data, including, by way of example, a programmable processor, a computer, a system on a chip, or multiple ones, or combinations of the foregoing. The bonding engine 108 can also be implemented as special purpose logic circuitry, for example, a field programmable gate array (FPGA) or an application specific integrated circuit (ASIC).

The network 104 facilitates wireless or wireline communications between the components of the PON 102 with any other local or remote computer, such as additional PONs, servers, or other devices communicably coupled to the network 104, including those not illustrated in FIG. 1A. As illustrated in FIG. 1A, the network 104 is depicted as a single network, but may be comprised of more than one network without departing from the scope of this disclosure.

In some situations, one or more of the illustrated components may be implemented, for example, as one or more cloud-based services or operations. The network 104 may be all or a portion of an enterprise or secured network, or at least a portion of the network 104 may represent a connection to the Internet, a public switched telephone network (PSTN), a data server, a video server, or additional or different networks. In some implementations, a portion of the network 104 may be a virtual private network (VPN). Further, all or a portion of the network 104 can comprise either a wireline or wireless link. Example wireless links may include 802.11ac/ad/af/a/b/g/n, 802.20, WiMax, LTE, free-space optical links, and/or any other appropriate wireless link. In other words, the network 104 encompasses any internal or external network, networks, sub-network, or combination thereof, operable to facilitate communications between various computing components, inside and outside the environment 100. The network 104 may communicate, for example, Internet Protocol (IP) packets, Frame Relay frames, Asynchronous Transfer Mode (ATM) cells, voice, video, data, and other suitable information between network addresses. The network 104 may also include one or more local area networks (LANs), radio access networks (RANs), metropolitan area networks (MANs), wide area networks (WANs), all or a portion of the Internet, and/or any other communication system or systems at one or more locations.

Figure 2:
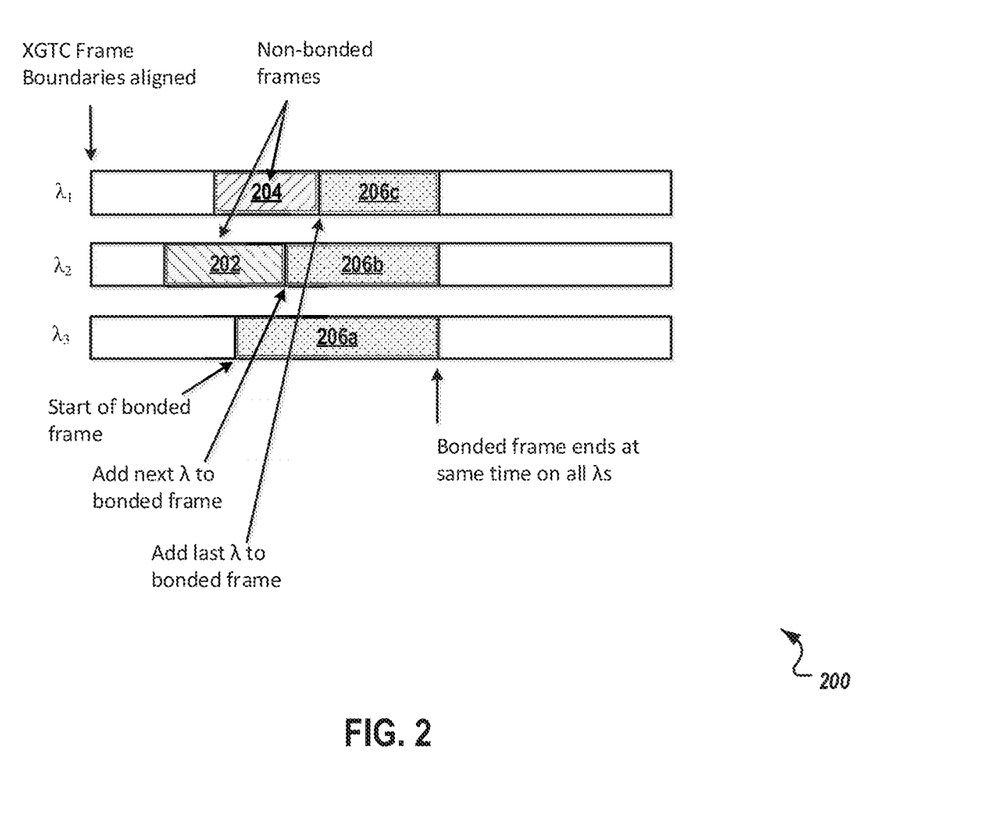
FIG. 2 is a diagram illustrating an example wavelength bonding scheme for transmitting a bonded frame.

FIG. 2 is a diagram illustrating an example wavelength bonding scheme 200 for transmitting a bonded frame when one or more wavelengths in a bonding group are transmitting non-bonded frames. The scheme 200 shown in FIG. 2, illustrates how OLT 106 allocates multiple wavelengths to transmit a bonded frame to ONU 112 when non-bonded frames are being transmitted on two of the multiple wavelengths similar to those described in FIG. 1A. In some implementations, the scheme 200 may include additional and/or different wavelengths not shown in the diagram. Wavelengths may also be omitted from the scheme 200.

As illustrated, 10-Gigabit-capable Passive Optical Network Transmission Convergence (XGTC) frame boundaries are aligned on three wavelengths $\lambda_1$, $\lambda_2$, and $\lambda_3$ at the OLT 106. For purposes of example, assume that all three wavelengths are idle at the beginning. Then, a non-bonded frame 202 is received by the OLT 106 to be transmitted to the ONU 114. The OLT 106 allocates the non-bonded frame 202 on wavelength $\lambda_2$ and transmits the non-bonded frame 202 to ONU 114 on the wavelength $\lambda_2$, since the ONU 114 can only receive data from the OLT 106 on the wavelength $\lambda_2$ as described in FIG. 1. While the non-bonded frame 202 is being transmitted on wavelength $\lambda_2$, another non-bonded frame 204 is received by the OLT 106 to be transmitted to the ONU 110. The OLT 106 allocates the non-bonded frame 204 on wavelength $\lambda_1$ and transmits the non-bonded frame 204 to ONU 110 on the wavelength $\lambda_1$, since the ONU 110 can only receive data from the OLT 106 on the wavelength $\lambda_1$ as described in FIG. 1A.

Pre-emption is not supported in either the ITU-T PONs (e.g., NG-PON2) or the IEEE PONs (e.g., 10G-EPON). When a bonded frame 206 (i.e., 206a-c) is received by the OLT 106 to be transmitted to the ONU 112 on wavelengths $\lambda_1$, $\lambda_2$, and $\lambda_3$ in a bonding group, only wavelength $\lambda_3$ is idle while wavelengths $\lambda_1$ and $\lambda_2$ are busy transmitting the non-bonded frames 204 and 202, respectively. Instead of waiting for all three wavelengths to be idle and then transmitting the bonded frame 206 on all three wavelengths, the bonding engine 108 of the OLT 106 can allocate the bonded frame 206 on all three wavelengths in advance (e.g., before transmissions of non-bonded frames on wavelengths $\lambda_1$ and $\lambda_2$ have completed) and start transmitting allocated portions of the bonded frame 206a on currently available wavelength $\lambda_3$. The bonded frame 206 is being transmitted at a data rate of a single wavelength (e.g., 8.67 Gbps). When wavelength $\lambda_2$ completes transmitting the non-bonded frame 202, allocated portions of the bonded frame 206b can be transmitted on the wavelength $\lambda_2$. As a result, the bonded frame 206 is being transmitted at a data rate of two wavelengths (e.g., 17.34 Gbps). When wavelength $\lambda_3$ completes transmitting the non-bonded frame 204, allocated portions of the bonded frame 206c can be transmitted on the wavelength $\lambda_1$. As a result, the bonded frame 206 is being transmitted at a data rate of three wavelengths (e.g., 26 Gbps).

The bonding engine 108 pre-allocates the bonded frame 206 on all three wavelengths in a way that transmissions of various portions of the bonded frame 206 end at the same time or substantially simultaneously (e.g., within 6.4 nanoseconds when a bonded frame comprises multiple 64-bit words and 10 Gbps data rate is provided on each wavelength). For example, the bonding engine 108 needs to determine in advance when each wavelength in the bonding group will be available for transmitting the bonded frame (e.g., when current transmission of a non-bonded frame over a given wavelength will be completed). Then, the bonding engine 108 can predetermine how many bytes of the bonded frame are to be sent on each bonded wavelength, so that transmissions of various portions of the bonded frame on the bonded wavelengths end at the same time as shown in FIG. 2. In some cases, transmissions of various portions of the bonded frame on the bonded wavelengths may not end at the same time, rather end substantially simultaneously (as shown and discussed in FIG. 4 below). In doing so, the bonding mechanism used by the bonding engine 108 for downstream direction does not require fragmentation headers (other than one instance of the normal XGEM frame header for each wavelength that carries a packet), sequence numbers, or reassembly buffers to implement wavelength bonding in a PON. Instead, the delay equalization technique (discussed in FIG. 3 below) is used to align data reception across the synchronous data paths.

Figure 3A:
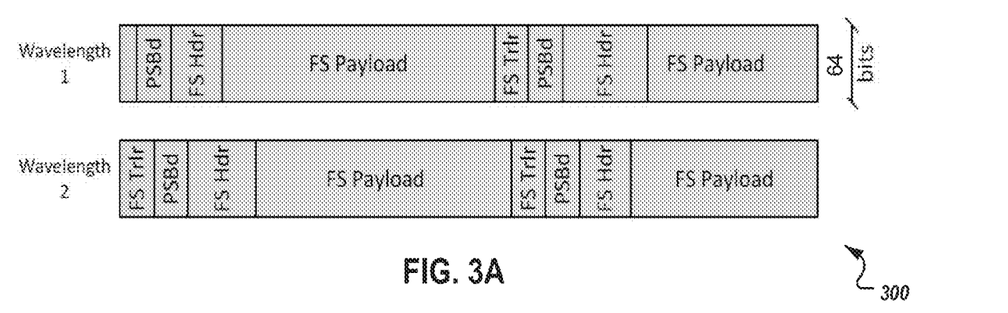
FIG. 3A is a diagram illustrating example received frames prior to delay equalization.
Figure 3B:
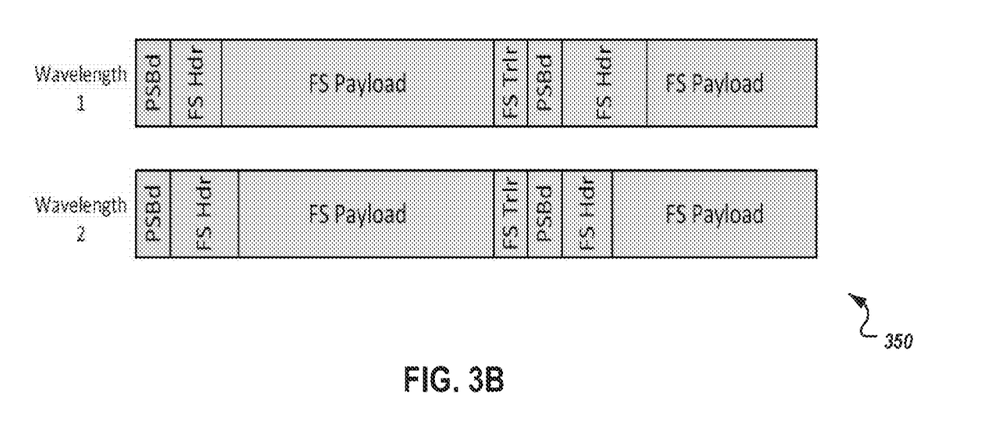
FIG. 3B is a diagram illustrating example received frames after delay equalization.

FIGS. 3A-3B are diagrams illustrating example received frames 300 prior to delay equalization and example received frames 350 after delay equalization. For purposes of example, the frames 300 and 350 shown in FIGS. 3A-3B are NG-PON2 frames. In some implementations, the frames 300 and 350 may include additional and/or different wavelengths not shown in the diagram. Wavelengths may also be omitted from the frames 300 and 350.

FIG. 3A illustrates parallel data received, for example, at an ONU on two wavelengths (e.g., $\lambda_1$ and $\lambda_2$) as a 64-bit aligned parallel data stream. Since data are received on two wavelengths, there is differential delay (or relative delay) between the two wavelengths. For example, on wavelength 1 (e.g., $\lambda_1$) the first Physical Synchronization Block downstream (PSBd) is received earlier than the first PSBd on wavelength 2 (e.g., $\lambda_2$) due to the differential delay.

FIG. 3B illustrates the received frames at the ONU on two wavelengths (e.g., $\lambda_1$ and $\lambda_2$) after delay equalization. For example, the NG-PON2 ONU can detect the differential delay between the two wavelengths from an OLT through measurement of the PSBd frame overhead and use that information to delay-equalize received frames (e.g., via digital signal buffering) on the two wavelengths. Alignment of PSBd overhead between wavelengths may be accomplished with concurrent PSBd headers, or with a known non-zero offset between PSBd overhead on different wavelength (as specified or dictated by means of control). Similarly an ONU using EPON may use alignment markers such as those specified for 40 GBASE-R or 100 GBASE-R, or multipoint MAC control (MPCP) timestamps to assist in delay equalization. Other methods of detecting delay alignment are also possible. After delay equalization, alignment of underlying data is assured across wavelengths to 8-byte boundaries (other alignment quanta such as 4 bytes or 16 bytes are also possible). Since the Framing Sublayer (FS) header (FS Hdr) may contain variable length BWmap and PLOAMd, FS Hdr on the two wavelengths may finish at different times. As a result, FS Payload on the two wavelengths may start at different times. In some implementations, instead of performing the delay equalization at an OLT receiver, an ONU transmitter can insert some offset based on the known differential delay into the transmitted frames so that the frames can be aligned when received at the receiver.

Figure 4:
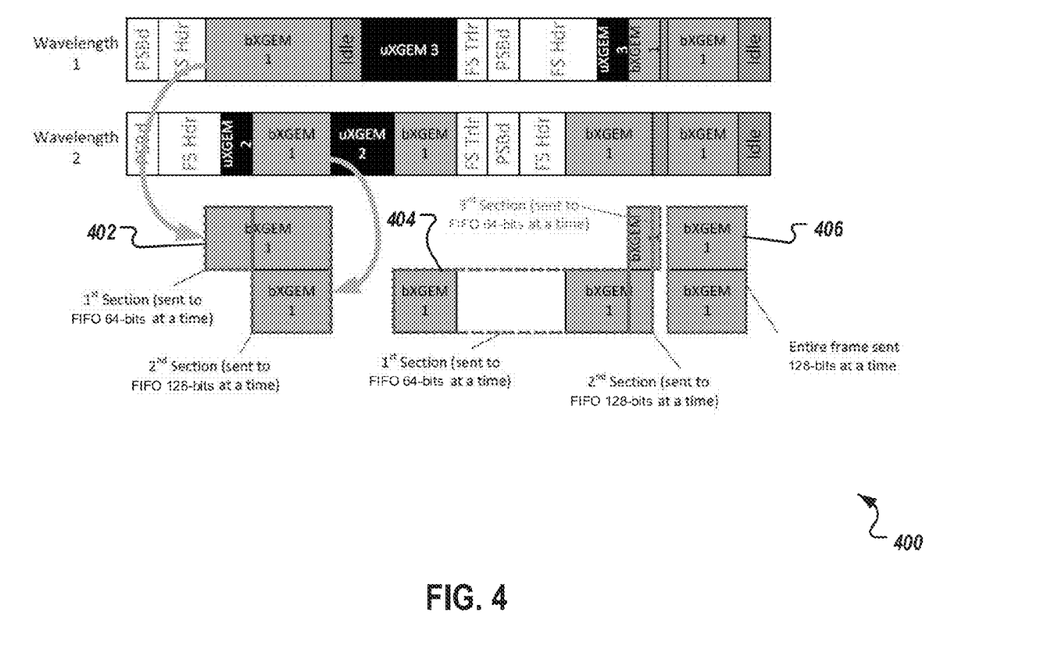
FIG. 4 is a diagram illustrating an example Framing Sublayer (FS) payload carrying bonded frames and non-bonded frames.

FIG. 4 is a diagram illustrating an example Framing Sublayer (FS) payload 400 carrying bonded frames and non-bonded frames (e.g., allocated by the bonding engine 108). For purposes of example, the frames in FIG. 4 are NG-PON2 frames. In some implementations, the payload 400 may be carried by additional and/or different wavelengths not shown in the diagram. Wavelengths may also be omitted from the payload 400.

As illustrated, FS payload sections on both wavelengths (e.g., $\lambda_1$ and $\lambda_2$) are filled with both bonded XGEM (bXGEM) frames and non-bonded XGEM (uXGEM) frames. For example, three bonded XGEM frames 402, 404, and 406 (e.g., denoted by bXGEM 1) are transmitted (not to scale) on wavelengths in a bonding group (e.g., wavelength 1 and 2). At the beginning, the first section of the bonded XGEM frame 402 is carried exclusively by wavelength 1 since wavelength 2 carries a non-bonded frame (e.g., an uXGEM 2 frame). A 64-bit word at a time of the first section of the bonded XGEM frame 402 is passed to a packet FIFO mechanism (e.g., at a data rate of roughly 8.67 Gbps accounting for Forward Error Correction (FEC)). After wavelength 2 completes transmission of the non-bonded frame, wavelength 2 joins wavelength 1 to carry second section of the bonded XGEM frame 402. As a result, a 128-bit word at a time of the second section of the bonded XGEM frame 402 is passed to the packet FIFO mechanism (e.g., at a data rate of roughly 17.34 Gbps accounting for FEC). For example, in a timeslot wavelength 1 carries the first 64-bit of a given 128-bit word to be transmitted and wavelength 2 carries the subsequent 64-bit of the given 128-bit word, followed in the next timeslot by wavelength 1's 64-bit data and then wavelength 2's 64-bit data, and so on (e.g., transmitting alternately between wavelengths 1 and 2). Both the transmitter and the receiver need to know this wavelength order of wavelength 1 first and wavelength 2 next. As illustrated in FIG. 4, the bonded XGEM frame 402 finishes with 128-bit alignment on wavelengths 1 and 2. Word sizes other than 64-bits may also be considered, for example 32-bit words or 128-bit words, though 64-bit words are illustrated for NG-PON2 since it is the base transmission quanta for XGEM payload.

For the bonded XGEM frame 404, first section of the bonded XGEM frame 404 is carried exclusively by wavelength 2 since wavelength 1 carries a non-bonded frame (e.g., an uXGEM 3 frame). A 64-bit word at a time of the first section of the bonded XGEM frame 404 is passed to the packet FIFO mechanism (e.g., at a data rate of roughly 8.67 Gbps accounting for FEC). After wavelength 1 completes transmission of the non-bonded frame, wavelength 1 joins wavelength 2 to carry second section of the bonded XGEM frame 404. As a result, a 128-bit word at a time of the second section of the bonded XGEM frame 404 is passed to the packet FIFO mechanism (e.g., at a data rate of roughly 17.34 Gbps accounting for FEC). As illustrated in FIG. 4, the bonded XGEM frame 404 finishes without 128-bit alignment on wavelengths 1 and 2, since the third section of the bonded XGEM frame 404 only has 64 bits and can be carried exclusively by wavelength 1. As a result, while wavelength 1 is transmitting the third section of the bonded XGEM frame 404, wavelength 2 is idle and can be used to carry a different frame, bonded or unbonded.

For the bonded XGEM frame 406, the entire frame begins on both wavelengths 1 and 2, and is carried 128-bits at a time for the duration of the frame (e.g., at a data rate of roughly 17.34 Gbps accounting for FEC). For example, in a timeslot wavelength 1 carries the first 64-bit of a given 128-bit word to be transmitted and wavelength 2 carries the subsequent 64-bit of the given 128-bit word, followed in the next timeslot by wavelength 1's 64-bit data and then wavelength 2's 64-bit data, and so on (e.g., transmitting alternately between wavelengths 1 and 2). As illustrated in FIG. 4, the bonded XGEM frame 406 finishes with 128-bit alignment on wavelengths 1 and 2.

Figure 5:
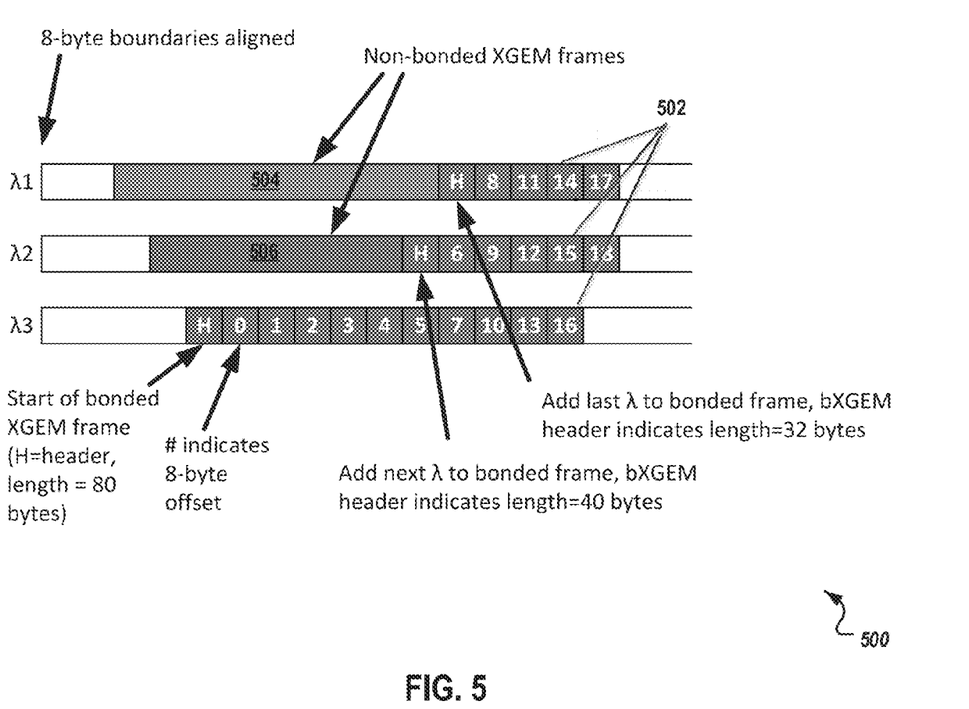
FIG. 5 is a diagram illustrating an example wavelength bonding scheme for demultiplexing Service Data Units (SDUs) across multiple wavelengths.

FIG. 5 is a diagram illustrating an example wavelength bonding scheme 500 for demultiplexing Service Data Units (SDUs, e.g. XGEM-encapsulated Ethernet frames) across multiple wavelengths. The scheme 500 shown in FIG. 5 illustrates how, for example, the bonding engine 108 of the OLT 106 allocates multiple wavelengths to transmit a bonded frame to ONU 112 when non-bonded frames are being transmitted on two of the multiple wavelengths similar to those described in FIGS. 1 and 2. In some implementations, the scheme 500 may include additional and/or different wavelengths not shown in the diagram. Wavelengths may also be omitted from the scheme 500.

For purposes of example, the frames in FIG. 5 are NG-PON2 frames and the bonded XGEM frame 502 comprising 150 bytes of data is divided into nineteen 64-bit (i.e., 8-byte) data segments (e.g., segment number 0 to segment number 18). In some implementations, the bonded XGEM frame 502 can be divided into 4-bytes data segments or any other length data segments. As illustrated, XGTC frame boundaries are aligned on three wavelengths $\lambda_1$, $\lambda_2$, and $\lambda_3$ at the OLT 106. At the beginning, all three wavelengths are idle. Then, a non-bonded XGEM frame 504 is received by the OLT 106 to be transmitted to the ONU 110. The OLT 106 allocates the non-bonded XGEM frame 504 on wavelength $\lambda_1$ and transmits the non-bonded XGEM frame 504 to ONU 110 on the wavelength $\lambda_1$, since the ONU 110 can only receive data from the OLT 106 on the wavelength $\lambda_1$ as described in FIG. 1A. While the non-bonded XGEM frame 504 is being transmitted on wavelength $\lambda_1$, another non-bonded XGEM frame 506 is received by the OLT 106 to be transmitted to the ONU 114. The OLT 106 allocates the non-bonded XGEM frame 506 on wavelength $\lambda_2$ and transmits the non-bonded XGEM frame 506 to ONU 114 on the wavelength $\lambda_2$, since the ONU 114 can only receive data from the OLT 106 on the wavelength $\lambda_2$ as described in FIG. 1A.

When the bonded XGEM frame 502 is received by the OLT 106 to be transmitted to the ONU 112 on wavelengths $\lambda_1$, $\lambda_2$, and $\lambda_3$ in a bonding group, only wavelength $\lambda_3$ is idle while wavelengths $\lambda_1$ and $\lambda_2$ are busy transmitting the non-bonded XGEM frames 504 and 506, respectively. Instead of waiting for all three wavelengths to be idle and then transmitting the bonded XGEM frame 502 on all three wavelengths, the bonding engine 108 of the OLT 106 can allocate the bonded XGEM frame 502 on all three wavelengths according to a specified wavelength order known to both the OLT 106 and the ONU 112 in advance (e.g., before transmissions of non-bonded XGEM frames on wavelengths $\lambda_1$ and $\lambda_2$ have completed) and start transmitting allocated portions of the bonded XGEM frame 502 on currently available wavelength $\lambda_3$. For example, before transmitting the bonded XGEM frame 502, the bonding engine 108 of the OLT 106 can determine when current transmission of non-bonded XGEM frames 504 and 506 over wavelengths $\lambda_1$ and $\lambda_2$ will be completed (e.g., by checking transmission schedule on each wavelength). Based on the determination, the bonding engine 108 can calculate how many 8-byte segments of the bonded XGEM frame 502 to be sent on each bonded wavelength, so that transmissions of various portions of the bonded XGEM frame 502 on the bonded wavelengths end at the same time or substantially simultaneously. As illustrated, the bonding engine 108 allocates segment number 0-7, 10, 13, and 16 on wavelengths $\lambda_3$, segment number 6, 9, 12, 15, and 18 on wavelengths $\lambda_2$, and segment number 8, 11, 14, and 17 on wavelengths $\lambda_1$. In the example of a 150-byte XGEM frame, all segments numbered 0-17 contain a full 8 bytes, and the final segment number 18 would contain only 6 bytes. In this example, the amount of additional overhead data required to send this frame over the bXGEM instead of a single wavelength is the two bXGEM headers (8 bytes each) for activating different wavelengths. In some cases, the transmitter may choose to send bXGEM frames over all wavelengths (to minimize latency), and in other cases the transmitter may limit the number of wavelengths over which to send a bXGEM frame (to minimize overhead, hence maximizing throughput). In some implementations, the allocation is sent to a transmission scheduler.

As illustrated for the example of carrying a 150-byte Ethernet payload, a bXGEM header is inserted each time a bonded XGEM frame is started on wavelengths that are known to be in-service and operational at the OLT 106 and ONU 112 for the intended SDU. The bXGEM header includes an XGEM id and payload length following the bXGEM header. For example, when the bonded XGEM frame 502 starts on $\lambda_3$, a bXGEM header, indicating bonded XGEM frame 502 and a data length of, for example, 80 bytes for ten 8-byte segments, is inserted before segment number 0. Similarly, when the bonded XGEM frame 502 starts on $\lambda_2$, a bXGEM header, indicating bonded XGEM frame 502 and a payload length of, for example, 38 bytes for five 8-byte segments, is inserted before segment number 6. When the bonded XGEM frame 502 starts on $\lambda_1$, a bXGEM header, indicating bonded XGEM frame 502 and a payload length of, for example, 30 bytes for four 8-byte segments, is inserted before segment number 8. As a result, when a non-bonding ONU receives the bXGEM header, it knows that the bonded XGEM frame is not for it and will, for example, discard the data received for a period of time calculated based on the data length in the bXGEM header. For the bonded receiver (e.g., the ONU 112), when receiving a bXGEM header and payload on, for example, a second and subsequent wavelength (i.e., $\lambda_2$), the bonded receiver knows the sequence of transmission across wavelengths $\lambda_2$ and $\lambda_3$ (e.g., the specified wavelength order known to the bonded receiver) and can reassemble the bonded XGEM frame 502.

Figure 6:
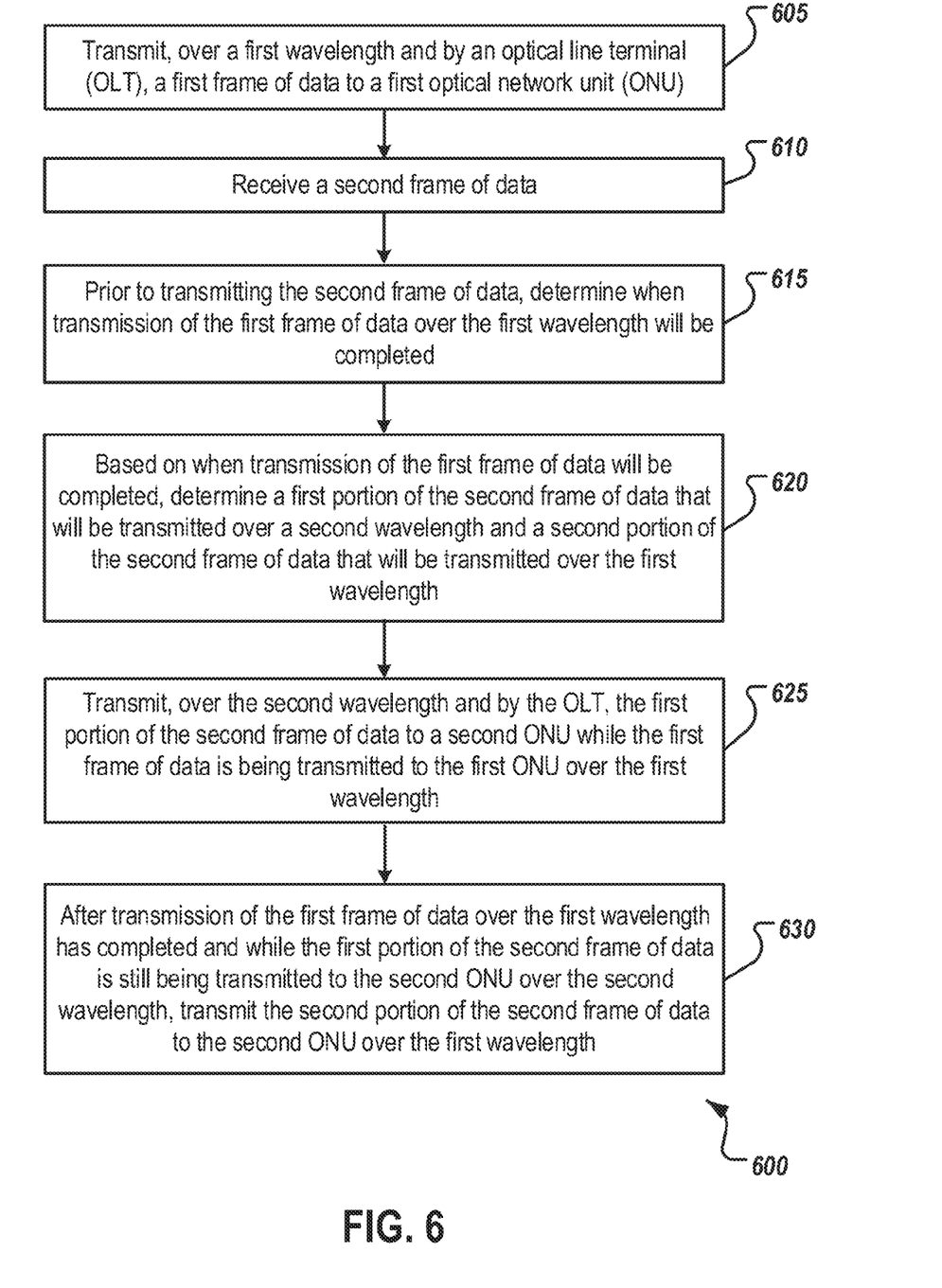
FIG. 6 is a flow chart of an example process for PON wavelength bonding.

FIG. 6 is a flow chart of an example process 600 for PON wavelength bonding. The example process 600 can be performed, for example, by one or more telecommunications devices, such as those described with reference to FIG. 1A (e.g., OLT 106). The example process 600 can also be implemented as instructions stored on a non-transitory, computer-readable medium that, when executed by one or more telecommunications devices, configures the one or more telecommunications devices to perform and/or causes the one or more telecommunications devices to perform the actions of the example process 600.

A first frame of data to a first optical network unit (ONU) is transmitted by an optical line terminal (OLT) over a first wavelength (605). In some implementations, the first frame of data is a non-bonded frame of data and the first ONU is a non-bonding ONU. In some implementations, there may be more processing flows that are directed by the constraints of the first frame of data as shown and discussed in FIG. 7 below.

A second frame of data is received by the OLT to be transmitted to a second ONU different than the first ONU (610). The second frame of data is a bonded frame of data and the second ONU is a bonding-capable ONU. The second frame of data is stored in a buffer for bonded data while the first frame of data is stored in a different buffer for non-bonded data. In some implementations, there is a single buffer for both bonded and non-bonded data. In some implementations, there is a buffer for each wavelength.

Prior to transmitting the second frame of data, a determination is made when transmission of the first frame of data over the first wavelength will be completed (615). In some implementations, the determination is made by checking the transmission schedule on the first wavelength.

Based on when transmission of the first frame of data will be completed, a first portion of the second frame of data that will be transmitted over a second wavelength and a second portion of the second frame of data that will be transmitted over the first wavelength are determined (620). In some implementations, the second frame of data is divided into 8-byte segments and the first portion includes multiple 8-byte segments of the second frame of data. In some implementations, the first portion of the second frame of data and the second portion of the second frame of data are both transmitted to the second ONU without a sequence number. In such a situation, both the OLT and the second ONU agree on how various portions of the second frame of data are assigned to various different wavelengths. In some implementations, an 8-byte XGEM header is added to both the first portion of the second frame of data and the second portion of the second frame of data.

While the first frame of data is being transmitted to the first ONU over the first wavelength, a first portion of a second frame of data to a second ONU is transmitted by the OLT over a second wavelength (625). After transmission of the first frame of data over the first wavelength has completed and while the first portion of the second frame of data is still being transmitted to the second ONU over the second wavelength, a second portion of the second frame of data to the second ONU is transmitted by the OLT over the first wavelength (630). In some implementations, transmissions of the first portion and the second portion of the second frame of data end at the same time.

In some implementations, a specified wavelength order is identified. The specified wavelength order specifies an order in which portions of a single data frame are to be transmitted over available wavelengths. The specified wavelength order is known to both the OLT and a given ONU. In some implementations, the specified wavelength order is defined by wavelength numbers in ascending order (e.g., $\lambda_1$ first, then $\lambda_2$, and $\lambda_3$). In some implementations, the specified wavelength order can be defined by wavelength numbers in descending order or any other order that both the OLT and the given ONU agreed upon. In some implementations, wavelength numbers are channel numbers assigned to wavelengths. When the specified wavelength order is identified, the first portion of the second frame of data is transmitted over a given wavelength that is highest in the wavelength order and is available to transmit data while the first frame of data is being transmitted over the first wavelength. Transmitting the second portion of the second frame of data over the first wavelength includes the following operations. A determination is made that the first wavelength is next highest in the wavelength order after the second wavelength. The second portion of the second frame of data is transmitted over the first wavelength based on the determination that the first wavelength is the next highest in the wavelength order. In some implementations, identifying the specified wavelength order includes identifying an NG-PON2 channel numbering corresponding to wavelengths being used to transmit data. In some implementations, the specified wavelength order may be determined and controlled by a software process at the OLT, and communicated through a management channel to the bonding-capable ONUs prior to establishing bonded communications.

In some implementations, when the specified wavelength order is identified, a determination is made, based on the wavelength order, that the second wavelength is last in the wavelength order and that the first wavelength is first in the wavelength order. In response to determining that the second wavelength is last in the wavelength order and that the first wavelength is first in the wavelength order, the second portion of the second frame of data is transmitted over the first wavelength based on the determination that the first wavelength is the first in the wavelength order.

In some implementations, a third frame of data is transmitted to the second ONU over the first and second wavelengths based on a specified wavelength order. The first and second wavelengths carry no traffic right before transmitting the third frame of data (e.g., both wavelengths are available). Various portions of the third frame of data are assigned round robin to the first and second wavelengths. For each of the first and second wavelengths, an 8-byte XGEM header is added with payload length for the third frame of data. In some implementations, a 4-byte header is added with payload length for the third frame of data for each of the first and second wavelengths.

In some implementations, the OLT implements a dynamic allocation algorithm. The dynamic allocation algorithm uses wavelength as a parameter in its bandwidth allocation for bonded entities (e.g., bonding-capable ONUs). In some implementations, the dynamic allocation algorithm allocates time grants for different wavelengths of a bonded Transmission Container (TCONT) based on which wavelengths will be available and how much data is being transmitted when in a bonded mode of operation.

In some implementations, the OLT includes a bonding engine, which includes one or more processes that perform operations in the example process 600. The one or more processes can be implemented in a dedicated hardware state machine, computer processor, and/or FPGA. In some implementations, the OLT and the first and second ONUs are on a Next-Generation Passive Optical Network 2 (NG-PON2). In some implementations, the OLT may separate its subsidiary components (e.g. bonding engine, transmission scheduler, DBA BWmap generator, optical transceivers) onto different processors, circuits, or hardware in a distributed manner.

The example process 600 shown in FIG. 6 can be modified or reconfigured to include additional, fewer, or different actions (not shown in FIG. 6), which can be performed in the order shown or in a different order. For example, before 625, various portions of the second frame of data are assigned to various different wavelengths based on a specified ordering of the wavelengths by the OLT. In some implementations, one or more of the actions shown in FIG. 6 can be repeated or iterated, for example, until a terminating condition is reached. In some implementations, one or more of the individual actions shown in FIG. 6 can be executed as multiple separate actions, or one or more subsets of the actions shown in FIG. 6 can be combined and executed as a single action. In some implementations, one or more of the individual actions shown in FIG. 6 may also be omitted from the example process 600.

Figure 7:
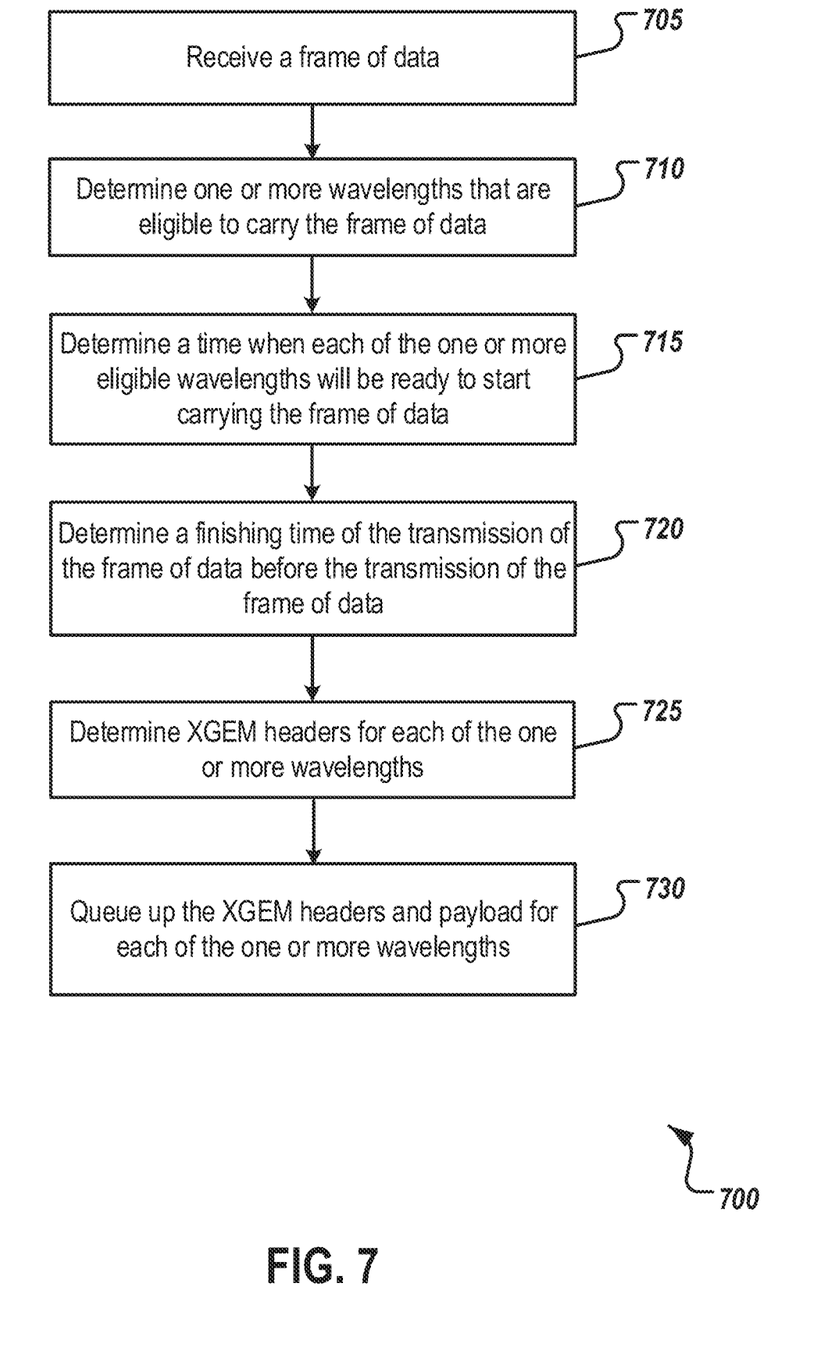
FIG. 7 is a flow chart of an example scheduling process for PON wavelength bonding of the downstream transmission.

FIG. 7 is a flow chart of an example scheduling process 700 for PON wavelength bonding of the OLT downstream (point-to-multipoint) transmission. The example scheduling process 700 can be performed, for example, by one or more telecommunications devices, such as those described with reference to FIG. 1A (e.g., OLT 106). The example scheduling process 700 can also be implemented as instructions stored on a non-transitory, computer-readable medium that, when executed by one or more telecommunications devices, configures the one or more telecommunications devices to perform and/or causes the one or more telecommunications devices to perform the actions of the example scheduling process 700.

A frame of data is received (705). In some implementations, the frame of data is received by an OLT to be transmitted to an ONU. One or more wavelengths that are eligible to carry the frame of data are determined (710). A time when each of the one or more eligible wavelengths will be ready to start carrying the frame of data is determined (715). In some implementations, the determination (e.g., 710, 715) is made by checking the transmission schedule on each of the one or more wavelengths. A finishing time of the transmission of the frame of data is determined before the transmission of the frame of data (720). In some implementations, the finishing time can be determined based on a preferred distribution of the frame of data across the one or more wavelengths. The preferred distribution distributes the frame of data across the one or more wavelengths so that transmissions of various portions of the frame of data on the one or more wavelengths end at the same time or substantially simultaneously (e.g., within a specified or threshold amount of time of each other). XGEM headers for each of the one or more wavelengths are determined (725). The XGEM headers and payload (e.g., various portions of the frame of data) for each of the one or more wavelengths are queued up for transmission (730).

The example scheduling process 700 shown in FIG. 7 can be modified or reconfigured to include additional, fewer, or different actions (not shown in FIG. 7), which can be performed in the order shown or in a different order. For example, before 730, other frames of data destined only for "busy" wavelengths are prevented from requesting the next allocation. In some implementations, one or more of the actions shown in FIG. 7 can be repeated or iterated, for example, until a terminating condition is reached. For example, after 730 the example scheduling process 700 may return to 705 to receive another frame of data. In some implementations, one or more of the individual actions shown in FIG. 7 can be executed as multiple separate actions, or one or more subsets of the actions shown in FIG. 7 can be combined and executed as a single action. In some implementations, one or more of the individual actions shown in FIG. 7 may also be omitted from the example scheduling process 700.

While this specification contains many specific implementation details, these should not be construed as limitations on the scope of any inventions or of what may be claimed, but rather as descriptions of features specific to particular embodiments of particular inventions. Certain features that are described in this specification, in the context of separate embodiments, can also be implemented in combination or in a single embodiment. Conversely, various features that are described in the context of a single embodiment can also be implemented in multiple embodiments, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method for a multi-wavelength Passive Optical Network (PON) communication system comprising:
    identifying a specified wavelength order that specifies an order in which portions of a single data frame are to be transmitted over available wavelengths;
    transmitting, by a first telecommunications device, one or more data frames over a plurality of wavelengths simultaneously, wherein the one or more data frames are distributed across the plurality of wavelengths over a plurality of fixed-length segments, including:
        transmitting, over a first wavelength and by the first telecommunications device, a first frame of data to a second telecommunications device;
        transmitting, over a second wavelength and by the first telecommunications device, a first fixed-length segment of a second frame of data to the second telecommunications device while the first frame of data is being transmitted to the second telecommunications device over the first wavelength, including transmitting the first fixed-length segment of the second frame of data over a given wavelength that is highest in the wavelength order and is available to transmit data while the first frame of data is being transmitted over the first wavelength; and after transmission of the first frame of data over the first wavelength has completed and while the first fixed-length segment of the second frame of data is still being transmitted to the second telecommunications device over the second wavelength, transmitting a second fixed-length segment of the second frame of data to the second telecommunications device over the first wavelength, including:

determining that the first wavelength is next highest in the wavelength order after the second wavelength; and transmitting the second fixed-length segment of the second frame of data over the first wavelength based on the determination that the first wavelength is the next highest in the wavelength order;

receiving, by the second telecommunications device, the plurality of fixed-length segments over the plurality of wavelengths; and reassembling, by the second telecommunications device, the received plurality of fixed-length segments based on synchronization and delay alignment of the transmitted plurality of fixed-length segments.

2. A method comprising:

identifying a specified wavelength order that specifies an order in which portions of a single data frame are to be transmitted over available wavelengths;

transmitting, over a first wavelength and by an optical line terminal (OLT), a first frame of data to a first optical network unit (ONU);

transmitting, over a second wavelength and by the OLT, a first portion of a second frame of data to a second ONU while the first frame of data is being transmitted to the first ONU over the first wavelength, including transmitting the first portion of the second frame of data over a given wavelength that is highest in the wavelength order and is available to transmit data while the first frame of data is being transmitted over the first wavelength; and after transmission of the first frame of data over the first wavelength has completed and while the first portion of the second frame of data is still being transmitted to the second ONU over the second wavelength, transmitting a second portion of the second frame of data to the second ONU over the first wavelength, including:

determining that the first wavelength is next highest in the wavelength order after the second wavelength; and transmitting the second portion of the second frame of data over the first wavelength based on the determination that the first wavelength is the next highest in the wavelength order.

3. The method of claim 2, further comprising:

receiving the second frame of data;

determining, prior to transmitting the first portion of the second frame of data, when transmission of the first frame of data over the first wavelength will be completed; and determining, based on when transmission of the first frame of data over the first wavelength will be completed, the first portion of the second frame of data that will be transmitted over the second wavelength and the second portion of the second frame of data that will be transmitted over the first wavelength.

4. The method of claim 2, wherein the first portion of the second frame of data and the second portion of the second frame of data are both transmitted to the second ONU without a sequence number.

5. The method of claim 2, wherein identifying the specified wavelength order comprises identifying an NG-PON2 channel numbering corresponding to wavelengths being used to transmit data.

6. The method of claim 2, further comprising assigning various portions of the second frame of data to various different wavelengths based on the specified wavelength order.

7. The method of claim 2, wherein frames of data are divided into one of 4 bytes segments, 8 bytes segments, or 16 bytes segments to create each of the first portion and the second portion of the second frame of data.

8. The method of claim 2, wherein the OLT implements a dynamic allocation algorithm using wavelength as a parameter in bandwidth allocation for bonded entities.

9. The method of claim 8, wherein the dynamic allocation algorithm allocates time grants for different wavelengths of a bonded Transmission Container (TCONT) based on which wavelengths will be available and how much data is being transmitted when in a bonded mode of operation.

10. The method of claim 2, wherein each portion of the second frame of data is smaller than a data packet, and each portion of the second frame of data includes a plurality of fixed-length segments.

11. The method of claim 2, further comprising:

transmitting, over a third wavelength and by the first ONU, a third frame of data to the OLT;

transmitting, over a fourth wavelength and by one of the first ONU and the second ONU, a first portion of a fourth frame of data to the OLT while the third frame of data is being transmitted to the OLT over the third wavelength; and after transmission of the third frame of data over the third wavelength has completed and while the first portion of the fourth frame of data is still being transmitted to the OLT over the fourth wavelength, transmitting, over the third wavelength and by the one of the first ONU and the second ONU, a second portion of the fourth frame of data to the OLT.

12. A method comprising:

identifying a specified wavelength order that specifies an order in which portions of a single data frame are to be transmitted over available wavelengths;

transmitting, over a first wavelength and by an optical line terminal (OLT), a first frame of data to a first optical network unit (ONU);

transmitting, over a second wavelength and by the OLT, a first portion of a second frame of data to a second ONU while the first frame of data is being transmitted to the first ONU over the first wavelength; and after transmission of the first frame of data over the first wavelength has completed and while the first portion of the second frame of data is still being transmitted to the second ONU over the second wavelength, transmitting a second portion of the second frame of data to the second ONU over the first wavelength, including:

determining, based on the wavelength order, that the second wavelength is last in the wavelength order and that the first wavelength is first in the wavelength order; and in response to determining that the second wavelength is last in the wavelength order and that the first wavelength is first in the wavelength order, transmitting the second portion of the second frame of data over the first wavelength, wherein transmitting the second portion of the second frame of data over the first wavelength is based on the determination that the first wavelength is the first in the wavelength order.

13. A method comprising:
transmitting, over a first wavelength and by an optical line terminal (OLT), a first frame of data to a first optical network unit (ONU);
transmitting, over a second wavelength and by the OLT, a first portion of a second frame of data to a second ONU while the first frame of data is being transmitted to the first ONU over the first wavelength;
after transmission of the first frame of data over the first wavelength has completed and while the first portion of the second frame of data is still being transmitted to the second ONU over the second wavelength, transmitting a second portion of the second frame of data to the second ONU over the first wavelength; and
transmitting a third frame of data to the second ONU over the first and second wavelengths based on a specified wavelength order, wherein the first and second wavelengths carry no traffic right before transmitting the third frame of data, various portions of the third frame of data are assigned round robin to the first and second wavelengths, and for each of the first and second wavelengths an 8 bytes header is added with payload length for the third frame of data.

14. A telecommunications device, comprising:
a transceiver configured to communicate over a fiber optic link; and
a bonding engine, including one or more processes that:
identify a specified wavelength order that specifies an order in which portions of a single data frame are to be transmitted over available wavelengths;
transmit, over a first wavelength, a first frame of data to a first optical network unit (ONU);
transmit, over a second wavelength, a first portion of a second frame of data to a second ONU while the first frame of data is being transmitted to the first ONU over the first wavelength, including transmitting the first portion of the second frame of data over a given wavelength that is highest in the wavelength order and is available to transmit data while the first frame of data is being transmitted over the first wavelength; and
after transmission of the first frame of data over the first wavelength has completed and while the first portion of the second frame of data is still being transmitted to the second ONU over the second wavelength, transmit a second portion of the second frame of data to the second ONU over the first wavelength, including:
determining that the first wavelength is next highest in the wavelength order after the second wavelength; and
transmitting the second portion of the second frame of data over the first wavelength based on the determination that the first wavelength is the next highest in the wavelength order.

15. The device of claim 14, wherein the one or more processes further:
receive the second frame of data;
determine, prior to transmitting the first portion of the second frame of data, when transmission of the first frame of data over the first wavelength will be completed; and
determine, based on when transmission of the first frame of data over the first wavelength will be completed, the first portion of the second frame of data that will be transmitted over the second wavelength and the second portion of the second frame of data that will be transmitted over the first wavelength.

16. The device of claim 14, wherein the first portion of the second frame of data and the second portion of the second frame of data are both transmitted to the second ONU without a sequence number.

17. The device of claim 14, wherein identifying the specified wavelength order comprises identifying an NG-PON2 channel numbering corresponding to wavelengths being used to transmit data.

18. The device of claim 14, wherein the one or more processes further assign various portions of the second frame of data to various different wavelengths based on the specified wavelength order.

19. The device of claim 14, wherein frames of data are divided into one of 4 bytes segments, 8 bytes segments, or 16 bytes segments.

20. A telecommunications device, comprising:
a transceiver configured to communicate over a fiber optic link; and
a bonding engine, including one or more processes that:
identify a specified wavelength order that specifies an order in which portions of a single data frame are to be transmitted over available wavelengths;
transmit, over a first wavelength, a first frame of data to a first optical network unit (ONU);
transmit, over a second wavelength, a first portion of a second frame of data to a second ONU while the first frame of data is being transmitted to the first ONU over the first wavelength; and
after transmission of the first frame of data over the first wavelength has completed and while the first portion of the second frame of data is still being transmitted to the second ONU over the second wavelength, transmit a second portion of the second frame of data to the second ONU over the first wavelength, including:
determine, based on the wavelength order, that the second wavelength is last in the wavelength order and that the first wavelength is first in the wavelength order; and
in response to determining that the second wavelength is last in the wavelength order and that the first wavelength is first in the wavelength order, transmit the second portion of the second frame of data over the first wavelength.

21. A system, comprising:
a plurality of optical network units (ONUs) connected to a fiber optic link; and
an optical line terminal (OLT) connected to the fiber optic link, wherein the OLT comprises a bonding engine, including one or more processes that:
identify a specified wavelength order that specifies an order in which portions of a single data frame are to be transmitted over available wavelengths;
transmit, over a first wavelength, a first frame of data to a first optical network unit (ONU) among the plurality of ONUs;

transmit, over a second wavelength, a first portion of a second frame of data to a second ONU among the plurality of ONUs while the first frame of data is being transmitted to the first ONU over the first wavelength, including transmitting the first portion of the second frame of data over a given wavelength that is highest in the wavelength order and is available to transmit data while the first frame of data is being transmitted over the first wavelength; and after transmission of the first frame of data over the first wavelength has completed and while the first portion of the second frame of data is still being transmitted to the second ONU over the second wavelength, transmit a second portion of the second frame of data to the second ONU over the first wavelength, including:

determining that the first wavelength is next highest in the wavelength order after the second wavelength; and transmitting the second portion of the second frame of data over the first wavelength based on the determination that the first wavelength is the next highest in the wavelength order.

22. A telecommunications device, comprising:

a transceiver configured to communicate over a fiber optic link; and a bonding engine, including one or more processes that:
transmit, over a first wavelength, a first frame of data to a first optical network unit (ONU);
transmit, over a second wavelength, a first portion of a second frame of data to a second ONU while the first frame of data is being transmitted to the first ONU over the first wavelength;
after transmission of the first frame of data over the first wavelength has completed and while the first portion of the second frame of data is still being transmitted to the second ONU over the second wavelength, transmit a second portion of the second frame of data to the second ONU over the first wavelength; and
transmit a third frame of data to the second ONU over the first and second wavelengths based on a specified wavelength order, wherein the first and second wavelengths carry no traffic right before transmitting the third frame of data, various portions of the third frame of data are assigned round robin to the first and second wavelengths, and for each of the first and second wavelengths an 8 bytes header is added with payload length for the third frame of data.

23. A system, comprising:

a plurality of optical network units (ONUs) connected to a fiber optic link; and an optical line terminal (OLT) connected to the fiber optic link, wherein the OLT comprises a bonding engine, including one or more processes that:
identify a specified wavelength order that specifies an order in which portions of a single data frame are to be transmitted over available wavelengths;
transmit, over a first wavelength, a first frame of data to a first optical network unit (ONU) among the plurality of ONUs;
transmit, over a second wavelength, a first portion of a second frame of data to a second ONU among the plurality of ONUs while the first frame of data is being transmitted to the first ONU over the first wavelength; and
after transmission of the first frame of data over the first wavelength has completed and while the first portion of the second frame of data is still being transmitted to the second ONU over the second wavelength, transmit a second portion of the second frame of data to the second ONU over the first wavelength, including:

determining, based on the wavelength order, that the second wavelength is last in the wavelength order and that the first wavelength is first in the wavelength order; and in response to determining that the second wavelength is last in the wavelength order and that the first wavelength is first in the wavelength order, transmitting the second portion of the second frame of data over the first wavelength, wherein transmitting the second portion of the second frame of data over the first wavelength is based on the determination that the first wavelength is the first in the wavelength order.

24. A system, comprising:

a plurality of optical network units (ONUs) connected to a fiber optic link; and an optical line terminal (OLT) connected to the fiber optic link, wherein the OLT comprises a bonding engine, including one or more processes that:
transmit, over a first wavelength, a first frame of data to a first optical network unit (ONU) among the plurality of ONUs;
transmit, over a second wavelength, a first portion of a second frame of data to a second ONU among the plurality of ONUs while the first frame of data is being transmitted to the first ONU over the first wavelength;
after transmission of the first frame of data over the first wavelength has completed and while the first portion of the second frame of data is still being transmitted to the second ONU over the second wavelength, transmit a second portion of the second frame of data to the second ONU over the first wavelength; and
transmit a third frame of data to the second ONU over the first and second wavelengths based on a specified wavelength order, wherein the first and second wavelengths carry no traffic right before transmitting the third frame of data, various portions of the third frame of data are assigned round robin to the first and second wavelengths, and for each of the first and second wavelengths an 8 bytes header is added with payload length for the third frame of data.

* * * * *